US012035231B2

(12) United States Patent
Li (10) Patent No.: US 12,035,231 B2
(45) Date of Patent: Jul. 9, 2024

(54) VIRTUALIZATION MANAGEMENT METHOD AND APPARATUS

(71) Applicant: HUAWEI TECHNOLOGIES CO., LTD., Guangdong (CN)

(72) Inventor: Shitao Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 494 days.

(21) Appl. No.: 17/333,417

(22) Filed: May 28, 2021

(65) Prior Publication Data

US 2021/0289435 A1    Sep. 16, 2021

Related U.S. Application Data

(63) Continuation of application No. PCT/CN2019/120707, filed on Nov. 25, 2019.

(30) Foreign Application Priority Data

Nov. 29, 2018    (CN) .......................... 201811445643.1

(51) Int. Cl.
*H04W 48/18* (2009.01)
*G06F 9/455* (2018.01)
(Continued)

(52) U.S. Cl.
CPC ........ *H04W 48/18* (2013.01); *G06F 9/45558* (2013.01); *H04W 4/50* (2018.02);
(Continued)

(58) Field of Classification Search
CPC ....... H04W 4/50; H04W 24/02; H04W 48/16; H04W 48/18; G06F 9/455; G06F 9/45558;
(Continued)

(56) References Cited

U.S. PATENT DOCUMENTS 11,249,814 B2 * 2/2022 Rauschenbach .... G06F 9/45558
2016/0359805 A1   12/2016 Spraggs et al.
(Continued)

FOREIGN PATENT DOCUMENTS

CN    105429806 A    3/2016
CN    106533935 A    3/2017
(Continued)

OTHER PUBLICATIONS

Yuan-Mao Hung et al., "Orchestration of NFV virtual applications based on TOSCA data models", 2017 19th Asia-Pacific Network Operations and Management Symposium (APNOMS), total 4 pages.
(Continued)

*Primary Examiner* — Oussama Roudani (57) ABSTRACT

A virtualization management method is disclosed. The method includes: A virtual network function manager (VNFM) receives a first instantiation request message of a virtual network function (VNF) sent by a service orchestrator (SO) or a network functions virtualization orchestrator (NFVO), where the first instantiation request message includes a VNF identifier and virtualised infrastructure manager (VIM) information, and the VIM information includes a VIM type and a supported template language. The VNFM obtains a VNF package based on the VNF identifier. When determining that the supported template language of the VIM information is a first template language, the VNFM obtains first VNF sub-information that is consistent with the first template language from template information, where the first VNF sub-information is used to deploy the VNF. The template information is included in a virtual network function descriptor (VNFD) of the VNF package. The VNFM sends the first VNF sub-information to a multi-cloud platform, so that the multi-cloud platform deploys the VNF on a corresponding VIM.

12 Claims, 4 Drawing Sheets

(51) Int. Cl.
  *H04W 4/50* (2018.01)
  *H04W 24/02* (2009.01)
  *H04W 48/16* (2009.01)
(52) U.S. Cl.
  CPC ........... *H04W 24/02* (2013.01); *H04W 48/16* (2013.01); *G06F 2009/45595* (2013.01)
(58) Field of Classification Search
  CPC ........... G06F 2009/45595; H04L 67/10; H04L 41/5041; H04L 41/0843; H04L 41/0895; H04L 41/40; H04L 41/342; H04L 41/5096
  See application file for complete search history.

(56) References Cited

U.S. PATENT DOCUMENTS

| | | | | |
|---|---|---|---|---|
| 2018/0004576 | A1* | 1/2018 | Gokurakuji | G06F 9/5077 |
| 2018/0024852 | A1* | 1/2018 | Yabushita | G06F 9/50 718/1 |
| 2018/0309646 | A1* | 10/2018 | Mustafiz | H04L 41/0893 |

FOREIGN PATENT DOCUMENTS

| | | |
|---|---|---|
| CN | 106921977 A | 7/2017 |
| CN | 108024256 A | 5/2018 |
| CN | 108234158 A | 6/2018 |
| CN | 108604334 A | 9/2018 |
| CN | 108885564 A | 11/2018 |
| CN | 109151077 A | 1/2019 |
| WO | 2017185251 A1 | 11/2017 |
| WO | 2017185922 A1 | 11/2017 |

OTHER PUBLICATIONS

Deng Xiaoheng et al., "Integrated Trust Based Resource Cooperation in Edge Computing", Journal of Computer Research and Development, 55(3): 449-477, 2018, with an English abstract, total 29 pages.
"Cloudify OpenStack built in types and plugins definitions", with History for cloudify-openstack-plugin / plugin.yaml, last Commits on Jan. 28, 2018, total 23 pages.
"Cloudify AWS EC2 built in types and plugins definitions", with History for cloudify-aws-plugin / plugin.yaml, last Commits on Oct. 24, 2017, total 21 pages.
Office Action issued in CN201811445643.1 dated Nov. 27, 2020, 6 pages.
Notice of Allowance issued in CN201811445643.1, dated Mar. 5, 2021, 4 pages.
International Search Report issued in PCT/CN2019/120707, dated Feb. 27, 2020, 10 pages.
GS NFV-MAN 001 V0.3.3 (Feb. 2014), Network Function Virtualization (NFV) Management and Orchestration, total 136 pages.
Draft ETSI GS NFV-SOL 001 V0.13.0 (Nov. 2018), Network Function Virtualization (NFV) Release 2; Protocols and Data Models; NFV descriptors based on TOSCA specification, total 215 pages.
Cong-Phuoc Hoang et al., "An Extended Virtual Network Functions Manager Architecture to Support Container", Information Science and System, ACM, 2 Penn Plaza, Suite 701 New York NY 10121-0701 USA, Apr. 27, 2018, total 4 pages.
Extended European Search Report issued in EP19890401.3, dated Nov. 25, 2021, 8 pages.

* cited by examiner

VIRTUALIZATION MANAGEMENT METHOD AND APPARATUS

CROSS-REFERENCE TO RELATED APPLICATIONS

This application is a continuation of International Application No. PCT/CN2019/120707, filed on Nov. 25, 2019, which claims priority to Chinese Patent Application No. 201811445643.1, filed on Nov. 29, 2018. The disclosures of the aforementioned applications are hereby incorporated by reference in their entireties.

TECHNICAL FIELD

This application relates to the field of virtual networks, and in particular, to a virtualization management method supporting a plurality of platforms and an apparatus.

BACKGROUND

Network function virtualization (NFV) is a technology in which a function of a dedicated device in a conventional network is carried by using a universal hardware device and a virtualization technology. This technology can reduce expensive costs resulted from deployment of the dedicated device. Software and hardware are decoupled, so that a network device function no longer depends on dedicated hardware. Resources can be flexibly shared by using a feature of cloud computing, to quickly develop and deploy a new service. In addition, automatic deployment, scaling, fault isolation, self-healing, and the like can be performed based on actual service requirements. In the NFV, a party that initiates a virtualization request is usually referred to as a service request party. A party that can receive a virtualization request and perform virtualization processing on a corresponding service based on the request is usually referred to as a virtualization service provider.

The service requester first needs to submit description information of the service, for example, a descriptor of a virtual network function (virtual network function descriptor, VNFD), to the service provider. The VNFD includes information about virtual resources required for deploying the virtual network function (VNF), for example, information including computing, storage, a network, and the like.

In the NFV, a VNFD template is defined by using a topology and orchestration specification for cloud applications (TOSCA) language. TOSCA is a template language developed by the organization for the advancement of structured information standards (OASIS) to describe topologies and O&M procedures of cloud computing applications. A service deployment package includes at least one service deployment description file, and the file further includes definitions of some elements to be used. For example, the service deployment package includes a ServiceTemplate file, and ServiceTemplate includes, for example, definitions of NodeType, RelationshipType, and Policies.

However, there are a plurality of types of virtualised infrastructure managers (VIM), such as an open source-based cloud computing management platform OpenStack, an Amazon Web Services (AWS) of Amazon, and a cloud computing platform Azure of Microsoft. These VIM platforms all provide native deployment templates. The deployment templates provided by different VIMs vary in syntax and resource definitions, for example, a HOT template language provided by the OpenStack, an EC2 template language provided by the AWS, an ARM template language provided by the Azure, and a YAML language-based deployment template provided by a container management-based platform Kubernates.

Currently, a TOSCA-based VNFD deployment template defined in the NFV is well supported only on an OpenStack-based VIM platform because a TOSCA template language and the HOT template language of the OpenStack both use a YAML and have similar syntax and similar resource definitions. The OpenStack also provides an open-source TOSCA-heat translator project, to convert the TOSCA template language to the HOT template language easily. However, when the VIM uses other platforms, such as the Azure and the AWS, or when a VNF is deployed in a container by using the platform Kubernates, the TOSCA VNFD template defined in the NFV cannot meet a requirement, and the VNF cannot be deployed on these VIM platforms.

SUMMARY

Embodiments of this application provide a virtualization management method and an apparatus, to effectively resolve cross-platform deployment of an application. A service is deployed on different platforms by using only one deployment template, and a unified template can be used to correctly deploy the service based on requirements of the different platforms, to support a plurality of resource platforms.

According to a first aspect, a virtualization management method is provided. The method includes: A virtual network function manager (VNFM) receives a first instantiation request message of a virtual network function (VNF) sent by a service orchestrator (SO) or a network functions virtualization orchestrator (NFVO), where the first instantiation request message includes a VNF identifier and virtualised infrastructure manager (VIM) information, and the VIM information includes a VIM type and a supported template language. The VNFM obtains a VNF package based on the VNF identifier. When determining that the supported template language of the VIM information is a first template language, the VNFM obtains first VNF sub-information that is consistent with the VIM type and the first template language from template information, where the first VNF sub-information is used to deploy the VNF, and the template information is included in a descriptor file VNFD of the VNF package. The VNFM sends the first VNF sub-information to a multi-cloud platform, so that the multi-cloud platform deploys the VNF on a VIM corresponding to the VIM type.

In an example embodiment, the method further includes: When determining that the supported template language of the VIM information is a second template language, the VNFM parses the VNFD of the VNF package, and generates a resource request based on a parsing result, where the resource request includes second VNF sub-information, and the second VNF sub-information is used to deploy the VNF. The VNFM sends the resource request to the multi-cloud platform, so that the multi-cloud platform deploys the VNF on the VIM corresponding to the VIM type.

In an example embodiment, the VNF package includes a metadata file of the second template language, and the metadata file includes an indication parameter; and that the VNFM parses the VNFD of the VNF package includes: The VNFM parses a first service template indicated by the indication parameter, where the first service template is included in the VNFD of the VNF package.

In an example embodiment, the first service template includes a first identifier, and that the VNFM parses a first service template indicated by the indication parameter includes: The VNFM parses the first service template and a second service template indicated by the first identifier.

In an example embodiment, the VNFD includes at least one node template, and each node template includes template information.

According to a second aspect, a virtualization management method is provided. The method includes: receiving a second instantiation request message of a virtual network function (VNF), where the second instantiation request includes a VNF identifier; determining a virtualised infrastructure manager (VIM) type; and sending a first instantiation request message of the VNF to the VNFM, where the first instantiation request message includes the VNF identifier and VIM information, the VIM information includes the VIM type and a supported template language, and the first instantiation request message is used by the VNFM to deploy the VNF.

According to a third aspect, a virtual network function manager is provided. The virtual network function manager includes: a receiving module, configured to receive a first instantiation request message of a virtual network function (VNF) sent by a service orchestrator (SO) or a network functions virtualization orchestrator (NFVO), where the first instantiation request message includes a VNF identifier and virtualised infrastructure manager (VIM) information, and the VIM information includes a VIM type and a supported template language; an obtaining module, configured to obtain a VNF package based on the VNF identifier; a determining module, configured to: when determining that the supported template language of the VIM information is a first template language, obtain first VNF sub-information that is consistent with the VIM type and the first template language from template information, where the first VNF sub-information is used to deploy the VNF, and the template information is included in a descriptor file VNFD of the VNF package; and a sending module, configured to send the first VNF sub-information to a multi-cloud platform, so that the multi-cloud platform deploys the VNF on a VIM corresponding to the VIM type.

In an example embodiment, the determining module is further configured to: when determining that the supported template language of the VIM information is a second template language, parse the VNFD of the VNF package, and generate a resource request based on a parsing result, where the resource request includes second VNF sub-information, and the second VNF sub-information is used to deploy the VNF; and the sending module is further configured to send the resource request to the multi-cloud platform, so that the multi-cloud platform deploys the VNF on the VIM corresponding to the VIM type.

In an example embodiment, the VNF package includes a metadata file of the second template language, and the metadata file includes an indication parameter; and that the determining module parses the VNFD of the VNF package includes: The determining module parses a first service template indicated by the indication parameter, where the first service template is included in the VNFD of the VNF package.

In an example embodiment, the first service template includes a first identifier, and that the determining module parses a first service template indicated by the indication parameter includes: The determining module parses the first service template and a second service template indicated by the first identifier.

In an example embodiment, the VNFD includes at least one node template, and each node template includes template information.

According to a fourth aspect, a virtualization management apparatus is provided. The apparatus is a service orchestrator (SO) or a network functions virtualization orchestrator (NFVO), and includes: a receiving module, configured to receive a second instantiation request message of a virtual network function (VNF), where the second instantiation request includes a VNF identifier; a determining module, configured to determine a virtualised infrastructure manager (VIM) type; and a sending module, configured to send a first instantiation request message of the VNF to a virtual network function manager (VNFM), where the first instantiation request message includes the VNF identifier and VIM information, the VIM information includes the VIM type and a supported template language, and the first instantiation request message is used by the VNFM to deploy the VNF.

According to a fifth aspect, a system is provided. The system includes the virtual network function manager according to the third aspect and the service orchestrator according to the fourth aspect.

According to a sixth aspect, a computer-readable storage medium storing a program is provided, where the program includes instructions. When the instructions are executed by a terminal, the terminal is enabled to perform the methods according to the first aspect and the second aspect.

According to a seventh aspect, a computer program product including instructions is provided. When the computer program product is run on a computer, the computer is enabled to perform the methods according to the first aspect and the second aspect.

A virtualization management method and an apparatus are disclosed. Template information for different VIM platforms is added to a VNFD, where the template information includes a plurality of pieces of different VNF sub-information for deploying the VNF on different VIM platforms. Therefore, for cross-platform service deployment, deployment information of the service deployment can be placed in one VNFD, to support a plurality of resource platforms, thereby effectively implementing cross-platform application deployment.

DESCRIPTION OF EMBODIMENTS

The following describes technical solutions in embodiments of this application with reference to the accompanying drawings in the embodiments of this application.

Figure 1:
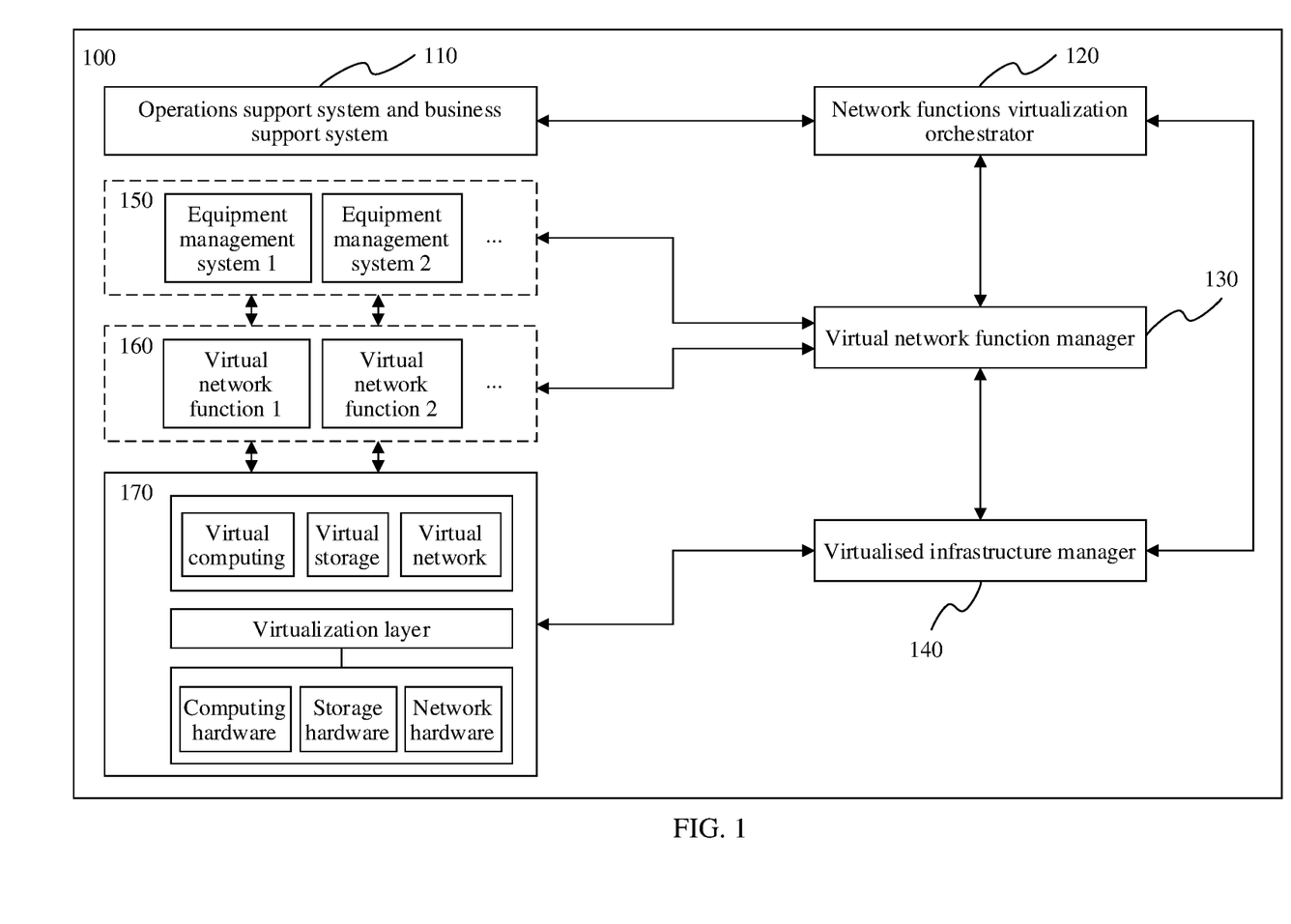
FIG. 1 is a schematic diagram of an NFV system architecture according to an embodiment of this application.

This application is applied to a network function virtualization system. As shown in FIG. 1, FIG. 1 is a schematic diagram of an NFV system architecture according to an embodiment of this application.

The NFV system architecture 100 includes an operations support system and business support system (OSS/BSS) 110, a network functions virtualization orchestrator (NFVO) 120, a virtual network function manager (VNFM) 130, a virtualised infrastructure manager (VIM) 140, an equipment management (EM) system 150, a virtual network function (VNF) 160, and a network functions virtualization infrastructure (NFVI) 170.

The OSS/BSS 110 supports various end-to-end teleservices. Management functions supported by the operations support system (OSS) include network configuration, service provisioning, fault management, and the like. The business support system (BSS) processes an order, payment, income, and the like, and supports product management, order management, profit management, and customer management.

The NFVO 120 is mainly responsible for processing life cycle management on a virtualization service, allocating and scheduling virtual resources in a virtual infrastructure and the NFVI, and the like. The NFVO 120 may communicate with one or more VNFMs 130, to execute a resource-related request. The NFVO 120 sends configuration information to the VNFM 130, to collect status information of the VNF 160. In addition, the NFVO 120 may also communicate with the VIM 140, to perform resource allocation and/or reservation, and exchange virtualized hardware resource configurations and status information.

The VNFM 130 is responsible for life cycle management of one or more VNFs 160, for example, instantiating, updating, querying, scaling, and terminating the VNFs 160. The VNFM 130 may communicate with the VNF 160, to complete life cycle management of the VNF and exchange configurations and status information. A plurality of VNFMs 130 may exist in the NFV architecture 100, and are responsible for performing life cycle management on different types of VNFs 160.

The VIM 140 is configured to control and manage interaction between the VNF 160 and computing hardware, storage hardware, network hardware, virtual computing, virtual storage, and a virtual network. For example, the VIM 140 performs resource management functions, including managing infrastructure resources, allocation, and an operation function. The allocation is, for example, addition of a resource to a virtual container, and the operation function is, for example, collection of NFVI fault information. The VNFM 130 and the VIM 140 may communicate with each other, to request resource allocation, exchange virtualized hardware resource configurations and status information, and the like.

The EM 150 is a system that is in a conventional telecommunication system and that is configured to configure and manage a device. In the NFV architecture 100, the EM 150 may also be configured to: configure and manage the VNF 160, and initiate a life cycle management operation, such as instantiation of a new VNF, to the VNFM 130. The EM 150 may include a plurality of EMs, for example, an equipment management system 1 and an equipment management system 2.

The VNF 160 is a virtual network function. There may be a plurality of different types of VNFs, such as a virtual network function 1 and a virtual network function 2.

The NFVI 170, an infrastructure layer of the NFV, includes a hardware component, a software component, or a combination thereof, to establish a virtualization environment in which the VNF 160 can be deployed, managed, and implemented. A hardware resource and a virtualization layer are used to provide virtual resources, such as a virtual machine and a virtual container in another form, for the VNF 160. The hardware resource includes the computing hardware, the storage hardware, the network hardware, and the like. In an implementation, resources of the computing hardware and the storage hardware may be centralized. The virtualization layer in the NFVI 170 may abstract the hardware resource, and decouple the VNF 160 from an underlying physical network layer.

For a TOSCA-based VNFD deployment template currently defined in the NFV, there is a TOSCA language-based cloud application deployment platform, for example, a cloud application deployment platform Cloudify. The Cloudify provides different plugins, so that the Cloudify connects to different VIM platforms, to deploy an application on the different VIM platforms. Currently, the plugins provided by the Cloudify include an Aria plugin, an Azure plugin, an OpenStack plugin, a Vsphere plugin, an AWS plugin, and the like. If the Cloudify is deployed on the VNFM or the NFVO, a plurality of types of VIMs, such as an OpenStack, an Aria, an Azure, a Vsphere, and an AWS, may be theoretically supported for the NFV.

In an architecture of the Cloudify platform, different TOSCA types are defined for different VIM platforms to model virtual resources. That is, for a same application, a plurality of VNFD templates need to be designed for different VIM platforms, to support deployment of the application.

For example, if a solution of the Cloudify is used for a to-be-deployed application, a VNF package of the to-be-deployed application includes VNFD files for different platforms. For example, openstack-blueprint.yaml is a VNFD file for an OpenStack platform; azure-blueprint.yaml is a VNFD file for an Azure platform; aws-blueprint.yaml is a VNFD file for an AWS platform.

If the Cloudify is not used, when a user needs to deploy an application on a specified VIM platform, a deployment template language supported by the specified VIM platform is usually used to design an application template. For example, an HOT template language is used to perform design for the OpenStack platform, an EC2 template language is used to perform design for the AWS, and an ARM template language is used to perform design for the Azure. Then, a pre-designed deployment template is sent to a corresponding VIM platform, and a required deployment parameter is carried in a sending request, to complete application deployment.

When the Cloudify is used, if a user wants to deploy an application on a specified VIM platform, a TOSCA model defined by the Cloudify needs to be used to design the application. The Cloudify provides different TOSCA templates for different VIM platforms. For example, if the VIM uses the OpenStack platform, the TOSCA model provided by the Cloudify is as follows:

cloudify.openstack.nodes.Server (representing a virtual machine resource)
    cloudify.openstack.nodes.Subnet (representing a virtual subnet resource)
    cloudify.openstack.nodes.SecurityGroup (representing a security group resource)
    cloudify.openstack.nodes.Router (representing a virtual router resource)
    cloudify.openstack.nodes.Network (representing a virtual network resource)

cloudify.openstack.nodes.Volume (representing a virtual storage resource)
cloudify.openstack.nova_net.nodes.FloatingIP (representing a floating IP resource), and the like, where for specific definitions, refer to https://raw.githubusercontent.com/cloudify-cosmo/cloudify-openstack-plugin/2.6.0/plugin.yaml.

After an application template designed by using this model is sent to the Cloudify platform, Cloudify parses the template based on a corresponding definition, and converts a parsing result into a resource application request of the OpenStack platform.

Steps on other platforms are similar. For example, if deployment is performed on the AWS, a TOSCA model of the AWS that is defined by the Cloudify needs to be used to design an application. An example is as follows:
cloudify.aws.nodes.Instance (representing a virtual machine resource)
cloudify.aws.nodes.SecurityGroup (representing a virtual security group resource)
cloudify.aws.nodes.Volume (representing a virtual storage resource)
cloudify.aws.nodes.VPC (representing a virtual network resource)
cloudify.aws.nodes.Subnet (representing a virtual subnet resource)
cloudify.aws.nodes.Interface (representing a virtual port resource), where for specific definitions, refer to https://github.com/cloudify-cosmo/cloudify-aws-plugin/releases/download/1.5.1.2/plugin.yaml.

TOSCA models defined for different VIM platforms differ greatly because different VIMs define resources differently. It can be learned from the foregoing models that the Cloudify platform does not effectively reduce design workload of the user. Instead, a TOSCA model of a specified VIM defined by the Cloudify also needs to be learned, and a native model for the VIM cannot be used.

As a more widely used service deployment template, the TOSCA is relatively widely used in the industry. The TOSCA template language is also used for the VNFD model defined in an NFV specification of the European Telecommunications Standards Institute. Although the Cloudify supports deployment of a plurality of types of applications on different VIM platforms by providing plug-ins, different TOSCA models need to be designed for the different VIM platforms. In the entire process, learning costs of the user are excessively high, and the user needs to master a plurality of TOSCA models for use. In addition, the preceding TOSCA models can be parsed by using only the Cloudify platform. The models are closely related to the VIMs and differ greatly from the model defined by the ETSI NFV. Therefore, workload of reconstructing the current VNFM or NFVO is heavy. In addition, the corresponding VIM platform cannot directly parse the TOSCA template. Therefore, during deployment, the Cloudify platform needs to convert the TOSCA model into a resource invocation API of the corresponding VIM platform, or convert the TOSCA model into a native deployment template of the corresponding VIM platform, to finally deploy an application.

The foregoing problem significantly increases costs of deploying the VNF, and the VNF cannot be deployed on different VIM platforms. Therefore, embodiments of this application provide a virtualization management method.

In the embodiments of this application, template information for different VIM platforms is added to a VNFD, so that during cross-platform deployment of a VNF, the VNF is deployed for different VIM platforms by using a VNFD with a general template. In addition, there is no need to design different TOSCA models for different VIM platforms, thus reducing learning costs of a user.

The following describes the technical solutions in the embodiments of this application with reference to the accompanying drawings in the embodiments of this application.

Figure 2:
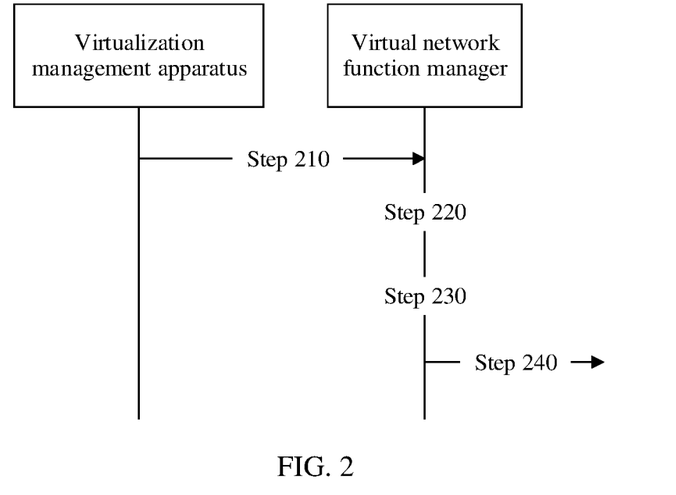
FIG. 2 is a flowchart of a virtualization management method according to an embodiment of this application.

FIG. 2 is a flowchart of a virtualization management method according to an embodiment of this application.

As shown in FIG. 2, the virtualization management method is provided, and includes the following steps.

Step 210: A service orchestrator (SO) or a network functions virtualization orchestrator (NFVO) sends a first instantiation request message of a virtual network function (VNF) to a VNFM, where the first instantiation request message includes a VNF identifier and virtualised infrastructure manager (VIM) information, and the VIM information includes a VIM type and a supported template language.

The service orchestrator (SO) or the network functions virtualization orchestrator (NFVO) sends the first instantiation request to the VNFM, where the instantiation request includes an identifier of a VNF needing to be deployed and the VIM information. The VNF identifier may be a VNF package ID. The VIM information includes a type of a VIM needing to be deployed and a deployment template language supported by the VIM type.

Step 220: The VNFM obtains a VNF package based on the VNF identifier.

The VNFM receives the first instantiation request message sent by the SO or the NFVO, and obtains the VNF package based on the VNF package ID. The VNFM obtains the VNF package from a database based on the VNF package ID in the request. In an example, the database may be a service design and creation (SDC) module in an open network automation platform (ONAP). First, a TOSCA.meta file in a TOSCA-Metadata folder in the VNF package is parsed. The file includes parameters such as Entry-Definitions. The Entry-Definitions parameter indicates an address and a file name of a service template VNFD TOSCA service template file that needs to be parsed first. In another example, a VNFD may include a plurality of TOSCA service templates. The following provides a more specific example. A VNFD TOSCA service template may be specifically:

```
topology_template:
  inputs:
    selected_flavour:
      type: string
      description: VNF deployment flavour selected by the consumer.
  node_templates:
    SunshineDB:
      type: MyCompany.SunshineDB.1_0.1_0
      properties:
        flavour_id: { get_input: selected_flavour}
        descriptor_id: b1bb0ce7-ebca-4fa7-95ed-4840d70a1177
        provider: Mycompany
        product_name: ShunshineDB
        software_version: 1.0
        descriptor_version: 1.0
        vnfm_info:
          - Mycompany
      requirements:
        - virtual_link
        - virtual_link
      artifacts:
        vim_specific_template_1:
          type: tosca.artifacts.nfv.Azure
          file: VNF_package/vnfd_for_Azure.arm
```

```
vim_specific_template_2:
    type: tosca.artifacts.nfv.AWS
    file: VNF_package/vnfd_for_AWS.EC2
```

As shown in the preceding code, the SunshineDB under the node_templates in the service template describes some pieces of basic information of the VNF, for example, information such as a description address descriptor_id of the VNF, an application provider, and an application name product_name.

Step 230: When determining that the supported template language of the VIM information is a first template language, the VNFM obtains first VNF sub-information that is consistent with the VIM type and the first template language from template information, where the first VNF sub-information is used to deploy the VNF. The template information is included in a descriptor file VNFD of the VNF package.

In an example, the first language may be any template language other than TOSCA, for example, ARM or EC2. When determining that the supported template language of the VIM information is not TOSCA, and is a template language such as ARM or EC2, the VNFM obtains the first VNF sub-information that is consistent with the VIM type and the first template language from the template information in the VNFD TOSCA service template. The template language may be the artifacts in the example of the VNFD TOSCA service template. In the artifacts, VIM template information that is of another template language and that needs to be used may be designed in advance as required. In an example, the artifacts parameter includes a plurality of pieces of different VNF sub-information, for example, vim_specific_template_1 and vim_specific_template_2. In this embodiment, naming in another format may also be allowed. If a type of vim_specific_template_1 is tosca.artifacts.nfv.Azure, it indicates that the artifacts parameter is used for an Azure-type template, and a file is a storage location of the artifacts in the VNF package. The suffix ".arm" indicates that a template language of the artifacts is ARM. Similarly, if a type of vim_specific_template_2 is tosca.artifacts.nfv.AWS, it indicates that the artifacts parameter is used for an AWS-type template, and a file is a storage location of the artifacts in the VNF package. The suffix ".arm" indicates that a template language of the artifacts is EC2.

In an example, the VIM information includes the VIM type such as VIM: Azure, and the supported template language such as Format: ARM.

The corresponding artifacts in the VNFD TOSCA service template and the corresponding first VNF sub-information in the artifacts, such as a corresponding vnfd_for_Azure.arm file in the VNF_package/vnfd_for_Azure.arm, are found based on the VIM information.

In this embodiment, descriptions of the artifacts are added, so that one VNFD is applicable to deployment on a plurality of different VIM platforms, to implement cross-platform deployment of an application, and support a plurality of resource platforms.

Step 240: The VNFM sends the first VNF sub-information to a multi-cloud platform, so that the multi-cloud platform deploys the VNF on a VIM corresponding to the VIM type.

In an example, the first VNF sub-information is the vnfd_for_Azure.arm file. After the VNFM determines the vnfd_for_Azure.arm file, the VNFM directly sends the vnfd_for_Azure.arm file to the multi-cloud platform. The vnfd_for_Azure.arm file is used by the multi-cloud platform to deploy the VNF on an Azure-type VIM platform.

In an embodiment, the VNFD includes at least one node template, and each node template includes template information. In an example, another improvement is provided for the VNFD TOSCA service template in the VNF package. The VNFD TOSCA service template indicated by the Entry-Definitions in the TOSCA.meta file remains unchanged, that is, a top-level TOSCA service template remains unchanged. A service template related to a deployment flavour is modified. That is, modification is performed in a lower-level service template. The following provides a more specific example. A lower level TOSCA service template may be specifically:

```
topology_template:
    substitution_mappings:
        node_type: MyCompany.SunshineDB.1_0.1_
        properties:
        requirements:
            - virtual_link: [dbBackendCp, virtual_link] # IPv4 for SQL
    node_templates:
        dbBackend:
            type: tosca.nodes.nfv.Vdu.Compute
            properties:
                name: ..
                description: ..
                boot_order: ..
                nfvi_constraints: ..
                configurable_properties:
                    additional_vnfc_configurable_properties: { }
                sw_image_data:
                    name: Software of Maria Db
                    version: 1.0
                    checksum: 9af30fce37a4c5c831e095745744d6d2
                    container_format: qcow2
                    disk_format: bare
                    min_disk: 2 GB
                    min_ram: 8096 MB
                    size: 2 GB
                    sw_image: maria.db.image.v1.0.qcow2
                    operating_system: Linux
                    supported_virtualisation_environments:
                        - KVM capabilities:
                virtual_compute:
                    properties:
                        virtual_memory:
                            virtual_mem_size: 8096 MB
                        virtual_cpu:
                            cpu_architecture: x86
                            num_virtual_cpu: 2
                            virtual_cpu_clock: 1800 MHZ
            requirements:
                - virtual_storage: mariaDbStorage
            artifacts:
                vim_specific_template_1:
                    type: tosca.artifacts.nfv.Azure
                    file: VNF_package/compute_for_Azure.arm
                vim_specific_template_2:
                    type: tosca.artifacts.nfv.AWS
                    file: VNF_package/compute_for_AWS.EC2
        mariaDbStorage:
            type: tosca.nodes.nfv.Vdu.VirtualStorage
            properties:
                type_of_storage: ..
                size_of_storage: ..
                rdma_enabled: ..
            artifacts:
                vim_specific_template_1:
                    type: tosca.artifacts.nfv.Azure
                    file: VNF_package/storage_for_Azure.arm
                vim_specific_template_2:
                    type: tosca.artifacts.nfv.AWS
                    file: VNF_package/storage_for_AWS.EC2
        dbBackendCp:
            type: tosca.nodes.nfv.Cp
            properties:
```

-continued

```
    layer_protocols: ipv4
    role: leaf
    description: External connection point to access the DB on IPv4
  requirements:
    - virtual_binding: dbBackend
    - virtual_link:
  artifacts:
    vim_specific_template_1:
      type: tosca.artifacts.nfv.Azure
      file: VNF_package/cp_for_Azure.arm
    vim_specific_template_2:
      type: tosca.artifacts.nfv.AWS
      file: VNF_package/cp_for_AWS.EC2
```

In the foregoing example, descriptions of artifacts are added to each node template, to indicate template information of a specific VIM of each node. In this embodiment, the template information of the corresponding VIM of each node is found based on the VIM information in the first instantiation request as in step 210 to step 230. When it is determined that a supported template language of the VIM information of the node is the first template language, the first VNF sub-information that is consistent with the VIM type and the first template language is obtained from the template information artifacts of the node. In an example, for example, the VIM information of the node in the request is:

VIM: Azure
Format: ARM

In this case, an artifact corresponding to each node template in the lower-level service template is found based on the VIM information. To be specific, VNF sub-information corresponding to a compute node is the compute_for_Azure.arm file indicated by the VNF_package/compute_for_Azure.arm address; VNF sub-information corresponding to a storage node is the storage_for_Azure.arm file indicated by the VNF_package/storage_for_Azure.arm address; VNF sub-information corresponding to a CP node is the cp_for_Azure.arm file indicated by the VNF_package/cp_for_Azure.arm address. Then, these pieces of sub-information are sent to the multi-cloud platform multi-cloud by performing step 240, and the multi-cloud sends the VNF sub-information of the foregoing nodes to a corresponding VIM platform for deploying the VNF, that is, deploying the VNF on the Azure platform.

The virtualization management method provided in this application can effectively implement cross-platform deployment of an application. A unified deployment template is used to support a plurality of resource platforms having a same upper-layer management platform.

Figure 3:
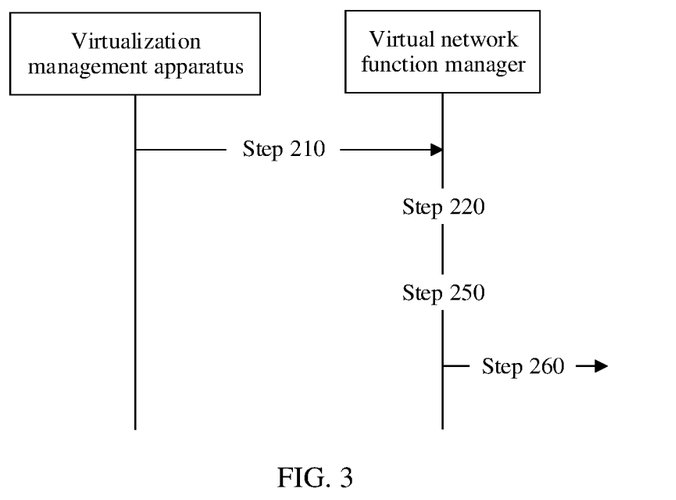
FIG. 3 is a flowchart of another virtualization management method according to an embodiment of this application.

FIG. 3 is a flowchart of another virtualization management method according to an embodiment of this application.

As shown in FIG. 3, the another virtualization management method is provided, and includes the following steps.

Step 210: A service orchestrator (SO) or a network functions virtualization orchestrator (NFVO) sends a first instantiation request message of a virtual network function (VNF) to a VNFM, where the first instantiation request message includes a VNF identifier and virtualised infrastructure manager (VIM) information, and the VIM information includes a VIM type and a supported template language.

Step 220: The VNFM obtains a VNF package based on the VNF identifier.

A person of ordinary skill in the art should note that step 210 and step 220 are consistent with step 210 and step 220 in FIG. 2. For ease of description, details are not repeated.

Step 250: When determining that the supported template language of the VIM information is a second template language, the VNFM parses a VNFD of the VNF package to generate a parsing result, and generates a resource request based on the generated parsing result, where the resource request includes second VNF sub-information, and the second VNF sub-information is used to deploy the VNF.

In an embodiment, the VNF package includes a metadata file of the second template language, and the metadata file includes an indication parameter; and parsing the VNFD of the VNF package includes: parsing a first service template indicated by the indication parameter, where the first service template is included in the VNFD of the VNF package.

In an instance, the second template language may be a TOSCA template language. For example, the VIM information in the first instantiation request may be:

VIM: OpenStack
Format: TOSCA

When it is determined that the supported template language of the VIM information is the TOSCA template language, a service template indicated by an indication parameter Entry-Definitions in the VNF package is parsed. A person of ordinary skill in the art should note that the first service template refers to a service template indicated by an indication parameter, and may be, for example, a top-level TOSCA service template indicated by the Entry-Definitions, or may be another service template indicated by another indication parameter. In this instance, the first service template may be a VNFD TOSCA service template. In the example of the VNFD TOSCA service template in step 220 in FIG. 2, the VNFM directly parses remaining parts other than the artifacts. In the remaining parts, the SunshineDB under the node_templates describes some pieces of basic information of the VNF, for example, information such as a description address descriptor_id of the VNF, an application provider, and an application name product_name. Then, information included in the VNFD is converted into a corresponding resource request, where the resource request includes the second VNF sub-information. The second VNF sub-information includes all parsed resource information for deploying the VNF and an invocation request, which are used to deploy the VNF subsequently. In an example, a resource such as a computing resource, a storage resource, and a network resource may be invoked.

In another instance, the first service template may further include a first identifier, and the parsing a first service template indicated by the indication parameter includes: parsing the first service template and a second service template indicated by the first identifier. For example, the first identifier may be a deployment flavour identifier flavour_id in the example of the VNFD TOSCA service template in step 220 in FIG. 2, and the deployment flavour identifier is described by using another TOSCA service template. A person of ordinary skill in the art should note that one VNFD may include a plurality of deployment flavours, and each deployment flavour is described by using an independent TOSCA service template. Then, each service template is parsed to obtain corresponding second VNF sub-information.

Step 260: Send the resource request to a multi-cloud platform, so that the multi-cloud platform deploys the VNF on the VIM corresponding to the VIM type.

In an example, the VNFM sends the second VNF sub-information obtained through parsing in step 250 to the multi-cloud platform, so that the multi-cloud platform deploys the VNF on a corresponding OpenStack platform.

In another example, for example, modification is performed on the lower-level service template in step 220 of FIG. 2. For example, the VIM information in the received first instantiation request may be:
  VIM: OpenStack
  Format: TOSCA In this case, the artifacts parameter in each node template is ignored, and information included in the VNFD is directly converted into a resource request corresponding to the OpenStack platform based on other descriptions in the node template. The resource request includes second VNF sub-information corresponding to each node. The second VNF sub-information includes all parsed resource information for deploying the VNF and an invocation request, which are used to deploy the VNF subsequently. In an example, a resource such as a computing resource, a storage resource, and a network resource may be invoked.

Figure 4:
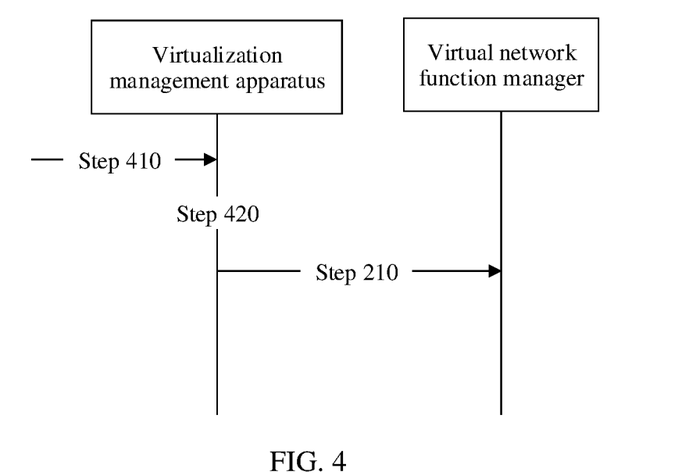
FIG. 4 is a flowchart of still another virtualization management method according to an embodiment of this application.

Before step 210 in FIG. 2 and FIG. 3, the method further includes the following steps, as shown in FIG. 4.

Step 410: Receive a second instantiation request message of a virtual network function (VNF), where the second instantiation request includes a VNF identifier.

In an embodiment, an SO or an NFVO receives the second instantiation request of the VNF, where the second instantiation request includes a VNF package ID on which the VNF is deployed.

Step 420: Determine a virtualised infrastructure manager (VIM) type.

In an embodiment, a type of data center on which the VNF is deployed may be selected based on a deployment policy of an ONAP. Different types of data centers are corresponding to different types of VIMs. In an example, the deployment policy of the ONAP may be resource utilization of a current VIM.

In an example, the VIM type determined in step 420 and a template language supported by the VIM type may be:
  VIM: OpenStack
  Format: TOSCA; or
  VIM: Azure
  Format: ARM A person of ordinary skill in the art should note that the foregoing provides only several possible forms of the determined VIM type and the template language supported by the VIM type, but is not limited thereto. Any change or replacement that can be easily thought of shall fall within the protection scope of this application.

Figure 5:
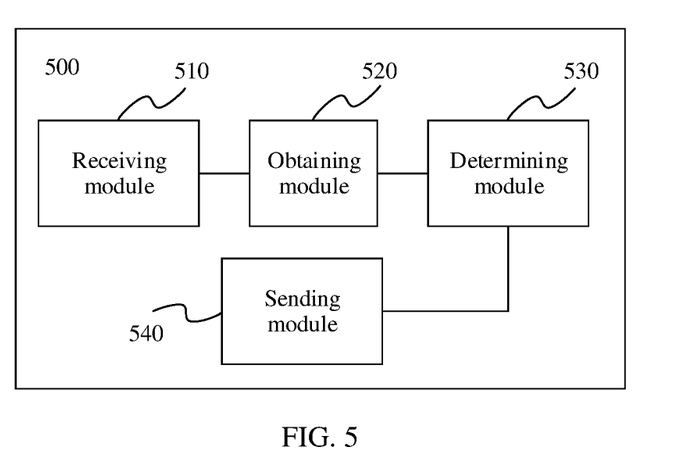
FIG. 5 is a schematic diagram of a virtualization management apparatus according to an embodiment of this application.

FIG. 5 is a schematic diagram of a virtualization management apparatus according to an embodiment of this application.

As shown in FIG. 5, a virtual network function manager 500 is provided, and includes a receiving module 510, an obtaining module 520, a determining module 530, and a sending module 540. The receiving module 510 is configured to receive a first instantiation request message of a virtual network function (VNF) sent by a service orchestrator (SO) or a network functions virtualization orchestrator (NFVO), where the first instantiation request message includes a VNF identifier and virtualised infrastructure manager (VIM) information, and the VIM information includes a VIM type and a supported template language. The obtaining module 520 is configured to obtain a VNF package based on the VNF identifier. The determining module 530 is configured to: when determining that the supported template language of the VIM information is a first template language, obtain first VNF sub-information that is consistent with the VIM type and the first template language from template information, where the first VNF sub-information is used to deploy the VNF, and the template information is included in a descriptor file VNFD of the VNF package. The sending module 540 is configured to send the first VNF sub-information to a multi-cloud platform, so that the multi-cloud platform deploys the VNF on a VIM corresponding to the VIM type.

In an example embodiment, the determining module 530 is further configured to: when determining that the supported template language of the VIM information is a second template language, parse the VNFD of the VNF package to generate a parsing result, and generate a resource request based on the generated parsing result, where the resource request includes second VNF sub-information, and the second VNF sub-information is used to deploy the VNF. The sending module 540 is further configured to send the resource request to the multi-cloud platform, so that the multi-cloud platform deploys the VNF on the VIM corresponding to the VIM type.

In an example embodiment, the VNF package includes a metadata file of the second template language, and the metadata file includes an indication parameter; and that the determining module 530 parses the VNFD of the VNF package includes: The determining module 530 parses a first service template indicated by the indication parameter, where the first service template is included in the VNFD of the VNF package.

In an example embodiment, the first service template includes a first identifier, and that the determining module 530 parses a first service template indicated by the indication parameter includes: The determining module 530 parses the first service template and a second service template indicated by the first identifier.

In an example embodiment, the VNFD includes at least one node template, and each node template includes template information.

Figure 6:
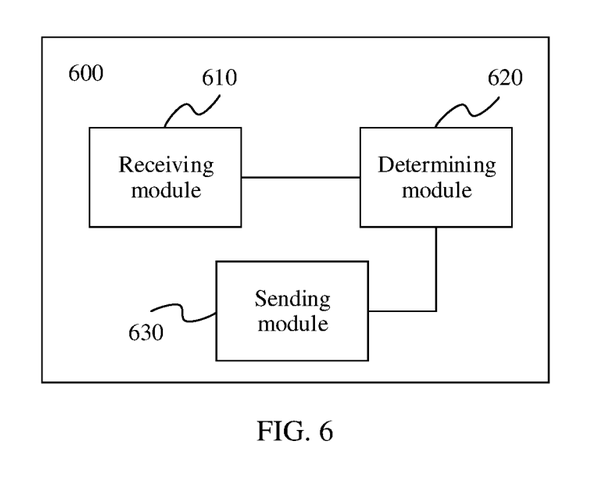
FIG. 6 is a schematic diagram of another virtualization management apparatus according to an embodiment of this application.

FIG. 6 is a schematic diagram of another virtualization management apparatus according to an embodiment of this application.

As shown in FIG. 6, a virtualization management apparatus 600 is provided. The apparatus may be an SO or an NFVO. The apparatus includes a receiving module 610, a determining module 620, and a sending module 630. The receiving module 610 is configured to receive a second instantiation request message of a virtual network function (VNF), where the second instantiation request includes a VNF identifier. The determining module 620 is configured to determine a virtualised infrastructure manager (VIM) type. The sending module 630 is configured to send a first instantiation request message of the VNF to a virtual network function manager (VNFM), where the first instantiation request message includes a VNF identifier and VIM information, the VIM information includes a VIM type and a supported template language, and the first instantiation request message is used by the VNFM to deploy the VNF.

In this application, template information for different VIM platforms is added to a VNFD, where the template information includes a plurality of pieces of different VNF sub-information for deploying the VNF on different VIM platforms. Therefore, for cross-platform service deployment, deployment information of the service deployment can be placed in one VNFD, to support a plurality of resource platforms, thereby effectively implementing cross-platform application deployment.

A person of ordinary skill in the art may be further aware that, in combination with the examples described in the embodiments disclosed in this specification, units and algorithm steps may be implemented by electronic hardware, computer software, or a combination thereof. To clearly describe interchangeability between the hardware and the software, compositions and steps of each example have generally been described in the foregoing specification based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or a part of the steps in the methods of the foregoing embodiments may be implemented by a program instructing a processor. The foregoing program may be stored in a computer-readable storage medium. The storage medium may be a non-transitory medium, for example, a random access memory, a read-only memory, a flash memory, a hard disk, a solid state drive, a magnetic tape, a floppy disk, an optical disc, or any combination thereof.

The foregoing descriptions are merely non-limiting examples of specific implementations, but are not intended to limit the protection scope, which is intended to cover any variation or replacement readily determined by a person of ordinary skill in the art. Therefore, the claims shall define the protection scope.

What is claimed is:

1. A virtualization management method, comprising:
   receiving, by a virtual network function manager (VNFM), a first instantiation request message of a virtual network function (VNF) sent by a service orchestrator (SO) or a network functions virtualization orchestrator (NFVO), wherein the first instantiation request message comprises a VNF identifier and virtualised infrastructure manager (VIM) information, and the VIM information comprises a VIM type and a supported template language;
   obtaining, by the VNFM, a VNF package based on the VNF identifier;
   determining, by the VNFM, whether the supported template language of the VIM information is a first template language;
   upon determination that the supported template language of the VIM information is the first template language, obtaining, by the VNFM, first VNF sub-information that is consistent with the VIM type and the first template language from template information, wherein the first VNF sub-information is used to deploy the VNF, and the template information is comprised in a virtual network function descriptor (VNFD) of the VNF package; and
   sending, by the VNFM, the first VNF sub-information to a multi-cloud platform, so that the multi-cloud platform deploys the VNF on a VIM corresponding to the VIM type,
   wherein the method further comprises:
   determining whether the supported template language of the VIM information is a second template language;
   upon determination that the supported template language of the VIM information is the second template language, parsing, by the VNFM, the VNFD of the VNF package to generate a parsing result, and generating a resource request based on the generated parsing result, wherein the resource request comprises second VNF sub-information, and the second VNF sub-information is used to deploy the VNF; and
   sending, by the VNFM, the resource request to the multi-cloud platform, so that the multi-cloud platform deploys the VNF on the VIM corresponding to the VIM type.

2. The method according to claim 1, wherein the VNF package comprises a metadata file of the second template language, and the metadata file comprises an indication parameter; and the parsing, by the VNFM, the VNFD of the VNF package comprises:
   parsing, by the VNFM, a first service template indicated by the indication parameter, wherein the first service template is comprised in the VNFD of the VNF package.

3. The method according to claim 2, wherein the first service template comprises a first identifier; and the parsing, by the VNFM, a first service template indicated by the indication parameter comprises:
   parsing, by the VNFM, the first service template and a second service template indicated by the first identifier.

4. The method according to claim 1, wherein the VNFD comprises at least one node template, and each of the at least one node template comprises the template information.

5. A virtualization management method, comprising:
   receiving a second instantiation request message of a virtual network function (VNF), wherein the second instantiation request message comprises a VNF identifier;
   determining a virtualised infrastructure manager (VIM) type; and
   sending a first instantiation request message of the VNF to a virtual network function manager (VNFM), wherein the first instantiation request message comprises the VNF identifier and VIM information, the VIM information comprises the VIM type and a supported template language, the VNF identifier is used by the VNFM to obtain a VNF package, and the first instantiation request message is used by the VNFM to deploy the VNF,
   wherein, when the supported template language of the VIM information is a first template language, the VNFM obtains first VNF sub-information that is consistent with the VIM type and the first template language from template information, wherein the first VNF sub-information is used to deploy the VNF, and the template information is comprised in a virtual network function descriptor (VNFD) of the VNF package, and the VNFM sends the first VNF sub-information to a multi-cloud platform, so that the multi-cloud platform deploys the VNF on a VIM corresponding to the VIM type; and
   wherein, when the supported template language of the VIM information is a second template language, the VNFM parses the VNFD of the VNF package to generate a parsing result, generates a resource request based on the generated parsing result, and sends the resource request to the multi-cloud platform, so that the multi-cloud platform deploys the VNF on the VIM corresponding to the VIM type, wherein the resource request comprises second VNF sub-information, and the second VNF sub-information is used to deploy the VNF.

6. A virtual network function manager, comprising:
   one or more processors, and
   a non-transitory computer-readable memory storing a program to be executed by the one or more processors, the program including instructions that, when executed by the one or more processors, enable the virtual network function manager to:

receive a first instantiation request message of a virtual network function (VNF) sent by a service orchestrator (SO) or a network functions virtualization orchestrator (NFVO), wherein the first instantiation request message comprises a VNF identifier and virtualised infrastructure manager (VIM) information, and the VIM information comprises a VIM type and a supported template language;

obtain a VNF package based on the VNF identifier;

determine whether the supported template language of the VIM information is a first template language;

upon determination that the supported template language of the VIM information is the first template language, obtain first VNF sub-information that is consistent with the VIM type and the first template language from template information, wherein the first VNF sub-information is used to deploy the VNF, and the template information is comprised in a virtual network function descriptor (VNFD) of the VNF package;

send the first VNF sub-information to a multi-cloud platform, so that the multi-cloud platform deploys the VNF on a VIM corresponding to the VIM type, determine whether the supported template language of the VIM information is a second template language;

upon determination that the supported template language of the VIM information is a second template language, parse the VNFD of the VNF package to generate a parsing result, and generate a resource request based on the generated parsing result, wherein the resource request comprises second VNF sub-information, and the second VNF sub-information is used to deploy the VNF; and send the resource request to the multi-cloud platform, so that the multi-cloud platform deploys the VNF on the VIM corresponding to the VIM type.

7. The virtual network function manager according to claim 6, wherein the VNF package comprises a metadata file of the second template language, and the metadata file comprises an indication parameter; and the program further includes instructions that, when executed by the one or more processors, enable the virtual network function manager to:

parse a first service template indicated by the indication parameter, wherein the first service template is comprised in the VNFD of the VNF package.

8. The virtual network function manager according to claim 7, wherein the first service template comprises a first identifier; and the program further includes instructions that, when executed by the one or more processors, enable the virtual network function manager to:

parse the first service template and a second service template indicated by the first identifier.

9. The virtual network function manager according to claim 6, wherein the VNFD comprises at least one node template, and each node template comprises the template information.

10. A virtual network function management apparatus, comprising:

one or more processors, and a non-transitory computer-readable memory storing a program to be executed by the one or more processors, the program including instructions that, when executed by the one or more processors, enable the virtual network function management apparatus to:

receive a second instantiation request message of a virtual network function (VNF), wherein the second instantiation request message comprises a VNF identifier;

determine a virtualised infrastructure manager (VIM) type; and send a first instantiation request message of the VNF to a virtual network function manager (VNFM), wherein the first instantiation request message comprises the VNF identifier and VIM information, the VIM information comprises the VIM type and a supported template language, the VNF identifier is used by the VNFM to obtain a VNF package, and the first instantiation request message is used by the VNFM to deploy the VNF, wherein, when the supported template language of the VIM information is a first template language, the VNFM obtains first VNF sub-information that is consistent with the VIM type and the first template language from template information, wherein the first VNF sub-information is used to deploy the VNF, and the template information is comprised in a virtual network function descriptor (VNFD) of the VNF package, and the VNFM sends the first VNF sub-information to a multi-cloud platform, so that the multi-cloud platform deploys the VNF on a VIM corresponding to the VIM type; and wherein, when the supported template language of the VIM information is a second template language, the VNFM parses the VNFD of the VNF package to generate a parsing result, generates a resource request based on the generated parsing result, and sends the resource request to the multi-cloud platform, so that the multi-cloud platform deploys the VNF on the VIM corresponding to the VIM type, wherein the resource request comprises second VNF sub-information, and the second VNF sub-information is used to deploy the VNF.

11. A system comprising the virtual network function manager according to claim 6.

12. A non-transitory computer-readable storage medium storing a program, wherein the program comprises instructions that, when executed by a terminal, enable the terminal to perform the method according to claim 1.

* * * * *

UNITED STATES PATENT AND TRADEMARK OFFICE
CERTIFICATE OF CORRECTION

| | |
|---|---|
| PATENT NO. | : 12,035,231 B2 |
| APPLICATION NO. | : 17/333417 |
| DATED | : July 9, 2024 |
| INVENTOR(S) | : Shitao Li |

It is certified that error appears in the above-identified patent and that said Letters Patent is hereby corrected as shown below:

In the Specification

Column 10, Line 46, change "1800 MHZ" to --1800 MHz--.

Signed and Sealed this
Sixth Day of August, 2024

Katherine Kelly Vidal
*Director of the United States Patent and Trademark Office*